United States Patent
Storer et al.

(10) Patent No.: US 10,515,117 B2
(45) Date of Patent: Dec. 24, 2019

(54) GENERATING AND REVIEWING MOTION METADATA

(71) Applicant: Cisco Technology, Inc., San Jose, CA (US)

(72) Inventors: Nathaniel Storer, Mountain View, CA (US); Jonathan Scoles, San Francisco, CA (US); Sean Christopher Rhea, San Francisco, CA (US); Ethan Atkins, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 331 days.

(21) Appl. No.: 15/432,720

(22) Filed: Feb. 14, 2017

(65) Prior Publication Data

US 2018/0232889 A1    Aug. 16, 2018

(51) Int. Cl.
*G06F 17/30* (2006.01)
*G06F 16/78* (2019.01)
(Continued)

(52) U.S. Cl.
CPC ........ *G06F 16/7867* (2019.01); *G06F 16/783* (2019.01); *G06F 16/786* (2019.01);
(Continued)

(58) Field of Classification Search
CPC .. G06F 16/7867; G06F 16/786; G06F 16/783; H04N 5/77; H04N 7/188; G06K 9/00771; G06K 9/00744; G06K 9/4642; G06K 2009/00738; G08B 13/19602; G08B 13/19671; G11B 27/11; G11B 27/28
See application file for complete search history.

(56) References Cited

U.S. PATENT DOCUMENTS

| | | |
|---|---|---|
| 4,460,807 A | 7/1984 | Kerr et al. |
| 4,890,257 A | 12/1989 | Anthias et al. |

(Continued)

FOREIGN PATENT DOCUMENTS

| | | |
|---|---|---|
| CN | 101055561 | 10/2007 |
| CN | 102572370 | 7/2012 |

(Continued)

OTHER PUBLICATIONS

International Search Report and Written Opinion from the International Searching Authority, dated Apr. 20, 2018, 12 pages, for the corresponding International Application PCT/US2018/017947.

(Continued)

*Primary Examiner* — Debbie M Le
(74) *Attorney, Agent, or Firm* — Polsinelli PC

(57) ABSTRACT

Aspects of the instant disclosure relate to methods for generating motion metadata for a newly captured video feed. In some aspects, methods of the subject technology can include steps for recording a video feed using the video capture system, partitioning the image frames into a plurality of pixel blocks, and processing the image frames to detect one or more motion events. In some aspects, the method may further include steps for generating motion metadata describing each of the one or more motion events. Systems and computer-readable media are also provided.

20 Claims, 7 Drawing Sheets

(51) Int. Cl.
  *H04N 5/77* (2006.01)
  *G06K 9/00* (2006.01)
  *G06F 16/783* (2019.01)
  *G08B 13/196* (2006.01)
  *G11B 27/11* (2006.01)
  *G11B 27/28* (2006.01)
  *H04N 7/18* (2006.01)
  *G06K 9/46* (2006.01)

(52) U.S. Cl.
  CPC ..... *G06K 9/00744* (2013.01); *G06K 9/00771* (2013.01); *G06K 9/4642* (2013.01); *G08B 13/19602* (2013.01); *G08B 13/19671* (2013.01); *G11B 27/11* (2013.01); *G11B 27/28* (2013.01); *H04N 5/77* (2013.01); *H04N 7/188* (2013.01); *G06K 2009/00738* (2013.01)

(56) References Cited

U.S. PATENT DOCUMENTS

| | | |
|---|---|---|
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,995,096 A | 11/1999 | Kitahara et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,934 B2 * | 3/2004 | Lin ............. H04N 19/65 375/240.16 |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,530,022 B2 | 5/2009 | Ben-Shachar et al. |
| 7,620,902 B2 | 11/2009 | Manion et al. |
| 7,634,533 B2 | 12/2009 | Rudolph et al. |
| 7,792,277 B2 | 9/2010 | Shaffer et al. |
| 7,881,450 B1 | 2/2011 | Gentle et al. |
| 7,920,160 B2 | 4/2011 | Tamaru et al. |
| 7,956,869 B1 | 6/2011 | Gilra |
| 8,059,557 B1 | 11/2011 | Sigg et al. |
| 8,081,205 B2 | 12/2011 | Baird et al. |
| 8,243,801 B2 * | 8/2012 | Yamauchi ............. G06T 7/223 375/240.12 |
| 8,274,893 B2 | 9/2012 | Bansal et al. |
| 8,290,998 B2 | 10/2012 | Stienhans et al. |
| 8,340,268 B2 | 12/2012 | Knaz |
| 8,358,327 B2 | 1/2013 | Duddy |
| 8,428,234 B2 | 4/2013 | Knaz |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,630,208 B1 | 1/2014 | Kjeldaas |
| 8,638,354 B2 | 1/2014 | Leow et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,831,505 B1 | 9/2014 | Seshadri |
| 8,890,924 B2 | 11/2014 | Wu |
| 8,892,646 B2 | 11/2014 | Chaturvedi et al. |
| 8,924,862 B1 | 12/2014 | Luo |
| 8,930,840 B1 | 1/2015 | Riskó et al. |
| 9,031,839 B2 | 5/2015 | Thorsen et al. |
| 9,032,028 B2 | 5/2015 | Davidson et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,141,860 B2 * | 9/2015 | Vunic ............. G06K 9/00711 |
| 9,143,729 B2 | 9/2015 | Anand et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,602,700 B2 * | 3/2017 | Ahiska ............. G08B 13/19691 |
| 9,609,030 B2 | 3/2017 | Sun et al. |
| 9,614,756 B2 | 4/2017 | Joshi |
| 9,667,799 B2 | 5/2017 | Olivier et al. |
| 9,762,709 B1 | 9/2017 | Snyder et al. |
| 9,892,518 B2 * | 2/2018 | Lazar ............. G06T 7/238 |
| 2002/0018051 A1 | 2/2002 | Singh |
| 2002/0076003 A1 | 6/2002 | Zellner et al. |
| 2002/0078153 A1 | 6/2002 | Chung et al. |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0174826 A1 | 9/2003 | Hesse |
| 2003/0197739 A1 | 10/2003 | Bauer |
| 2003/0227423 A1 | 12/2003 | Arai et al. |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0267938 A1 | 12/2004 | Shoroff et al. |
| 2005/0014490 A1 | 1/2005 | Desai et al. |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0215229 A1 | 9/2005 | Cheng |
| 2006/0004911 A1 | 1/2006 | Becker et al. |
| 2006/0026255 A1 | 2/2006 | Malamud et al. |
| 2006/0083305 A1 | 4/2006 | Dougherty et al. |
| 2006/0164552 A1 | 7/2006 | Cutler |
| 2006/0224430 A1 | 10/2006 | Butt |
| 2006/0250987 A1 | 11/2006 | White et al. |
| 2007/0005752 A1 | 1/2007 | Chawla et al. |
| 2007/0041366 A1 | 2/2007 | Vugenfirer et al. |
| 2007/0058842 A1 | 3/2007 | Vallone et al. |
| 2007/0091831 A1 | 4/2007 | Croy et al. |
| 2007/0100986 A1 | 5/2007 | Bagley et al. |
| 2007/0116225 A1 | 5/2007 | Zhao et al. |
| 2007/0139626 A1 | 6/2007 | Saleh et al. |
| 2007/0198637 A1 | 8/2007 | Deboy et al. |

(56) References Cited

U.S. PATENT DOCUMENTS

| | | |
|---|---|---|
| 2007/0248244 A1 | 10/2007 | Sato et al. |
| 2007/0250567 A1 | 10/2007 | Graham et al. |
| 2008/0068447 A1 | 3/2008 | Mattila et al. |
| 2008/0080532 A1 | 4/2008 | O'Sullivan et al. |
| 2008/0209452 A1 | 8/2008 | Ebert et al. |
| 2009/0012963 A1 | 1/2009 | Johnson et al. |
| 2009/0100142 A1 | 4/2009 | Stern et al. |
| 2009/0193327 A1 | 7/2009 | Roychoudhuri et al. |
| 2009/0254619 A1 | 10/2009 | Kho et al. |
| 2009/0256901 A1 | 10/2009 | Mauchly et al. |
| 2009/0292999 A1 | 11/2009 | LaBine et al. |
| 2009/0309846 A1 | 12/2009 | Trachtenberg et al. |
| 2010/0005142 A1 | 1/2010 | Xiao et al. |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0094867 A1 | 4/2010 | Badros et al. |
| 2010/0121959 A1 | 5/2010 | Lin et al. |
| 2010/0157978 A1 | 6/2010 | Robbins et al. |
| 2010/0211872 A1 | 8/2010 | Rolston et al. |
| 2010/0245535 A1 | 9/2010 | Mauchly |
| 2010/0262925 A1 | 10/2010 | Liu et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0075830 A1 | 3/2011 | Dreher et al. |
| 2011/0131498 A1 | 6/2011 | Chao et al. |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0013704 A1 | 1/2012 | Sawayanagi et al. |
| 2012/0084714 A1 | 4/2012 | Sirpal et al. |
| 2012/0179502 A1 | 7/2012 | Farooq et al. |
| 2012/0190386 A1 | 7/2012 | Anderson |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0306757 A1 | 12/2012 | Keist et al. |
| 2012/0306993 A1 | 12/2012 | Sellers-Blais |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0063542 A1 | 3/2013 | Bhat et al. |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0185672 A1 | 7/2013 | McCormick et al. |
| 2013/0198629 A1 | 8/2013 | Tandon et al. |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040819 A1 | 2/2014 | Duffy |
| 2014/0068452 A1 | 3/2014 | Joseph et al. |
| 2014/0078182 A1 | 3/2014 | Utsunomiya |
| 2014/0108486 A1 | 4/2014 | Borzycki et al. |
| 2014/0157338 A1 | 6/2014 | Pearce |
| 2014/0161243 A1 | 6/2014 | Contreras et al. |
| 2014/0185686 A1* | 7/2014 | Wu ............... H04N 19/597 375/240.16 |
| 2014/0198175 A1 | 7/2014 | Shaffer et al. |
| 2014/0237371 A1 | 8/2014 | Klemm et al. |
| 2014/0280595 A1 | 9/2014 | Mani et al. |
| 2014/0282213 A1 | 9/2014 | Musa et al. |
| 2014/0317561 A1 | 10/2014 | Robinson et al. |
| 2014/0351327 A1 | 11/2014 | Huang et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0074189 A1 | 3/2015 | Cox et al. |
| 2015/0081885 A1 | 3/2015 | Thomas et al. |
| 2015/0085060 A1 | 3/2015 | Fish et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0172120 A1 | 6/2015 | Dwarampudi et al. |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0373063 A1 | 12/2015 | Vashishtha et al. |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0173537 A1 | 6/2016 | Kumar et al. |
| 2016/0182580 A1 | 6/2016 | Nayak |
| 2016/0188980 A1* | 6/2016 | Martin ............... G06K 9/00771 382/103 |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2016/0379373 A1* | 12/2016 | Givon et al. ............... G06T 7/20 382/103 |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0104961 A1 | 4/2017 | Pan et al. |
| 2017/0324850 A1 | 11/2017 | Snyder et al. |

FOREIGN PATENT DOCUMENTS

| | | |
|---|---|---|
| CN | 102655583 | 9/2012 |
| CN | 102938834 | 2/2013 |
| CN | 103141086 | 6/2013 |
| CN | 204331453 | 5/2015 |
| EP | 959585 | 11/1999 |
| EP | 1488630 | 12/2004 |
| EP | 2341686 | 8/2016 |
| WO | WO 2012/167262 | 12/2012 |
| WO | WO 2014/118736 | 8/2014 |

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.

Author Unknown, ""I can see the future" 10 predictions concerning cell-phones," Surveillance Camera Players, http://www.notbored.org/cell-phones.html, Jun. 21, 2003, 2 pages.

Author Unknown, "Active screen follows mouse and dual monitors," KDE Community Forums, Apr. 13, 2010, 3 pages.

Author Unknown, "Implementing Media Gateway Control Protocols" A RADVision White Paper, Jan. 27, 2002, 16 pages.

Author Unknown, "Manage Meeting Rooms in Real Time," Jan. 23, 2017, door-tablet.com, 7 pages.

Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).

Cisco Systems, Inc., "Cisco WebEx Meetings Server System Requirements release 1.5." 30 pages, Aug. 14, 2013.

(56) References Cited

OTHER PUBLICATIONS

Cisco White Paper, "Web Conferencing: Unleash the Power of Secure, Real-Time Collaboration," pp. 1-8, 2014.
Clarke, Brant, "Polycom Announces RealPresence Group Series," "Polycom Announces RealPresenoe Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), http://www.iste.org/docs/excerpts/VIDCO2-excerpt.pdf (last accessed 1011-2013), 2009.
Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed 10-112013).
Infocus, "Mondopad," Mondopad. http://www.infocus.com/sites/default/files/InFocus-Mondopad-INF5520a-INF7021-Datasheet-EN.pdf (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.
Polycom, "Polycom UC Board, Transforming ordinary surfaces into virtual whiteboards" 2012, Polycom, Inc., San Jose, CA, http://www.uatg.com/pdf/polycom/polycom-uc-board-datasheet.pdf, (last accessed Oct. 11, 2013).
Stevenson, Nancy, "Webex Web Meetings for Dummies" 2005, Wiley Publishing Inc., Indianapolis, Indiana, USA, 339 pages.
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
TNO, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—http://www.vidvo.com/products/vidvobanorama/ dated 2013 (last accessed Oct. 11, 2013).

\* cited by examiner

GENERATING AND REVIEWING MOTION METADATA

TECHNICAL FIELD

The disclosed technology relates to systems and methods for facilitating the retroactive review of video data and in particular, for performing real-time processing on a recorded video feed and storing motion metadata for the subsequent search of motion events.

BACKGROUND

The proliferation of video cameras, such as those deployed in security surveillance setups, has drastically increased the amount of collected video data. Because human review of camera footage is tiresome and expensive, some processing techniques have been developed that enable the pre-selection of areas-of-interest within the feed for which processing is to be performed. However, such processing methods require that the user identify regions of interest before recording, a constraint that is often impractical for security deployments in which a location of events-of-interest within the frame is often hard to predict.

BRIEF DESCRIPTION OF THE DRAWINGS

The embodiments herein may be better understood by referring to the following description in conjunction with the accompanying drawings in which like reference numerals indicate similar elements. It is understood that these drawings depict only example embodiments of the disclosure and are not to be considered limiting in scope. The principles herein are described and explained with additional specificity and detail through the use of the accompanying drawings in which.

OVERVIEW

Aspects of the instant disclosure relate to methods for generating motion metadata for a newly captured video feed. In some aspects, a process of the technology can include steps for recording a video feed (e.g., storing video data) using a video capture system, partitioning image frames of the video feed into a multiple pixel blocks, and processing the image frames to detect one or more motion events. In some aspects, the process can further include steps for generating motion metadata describing each of the motion events.

DESCRIPTION

Aspects of the disclosed technology address some of the limitations of searching for motion events in legacy video content by providing systems/methods to facilitate the real-time processing of motion events within a recorded video feed. In some aspects, motion events are associated with frame and/or frame-location before storage is completed. As such, the disclosed technology facilitates the quick and easy searching of motion events in stored video data, including the selection and searching of motion events within a frame-subset that defines and area within the video feed that can be selected for the search of motion events.

Figure 1:
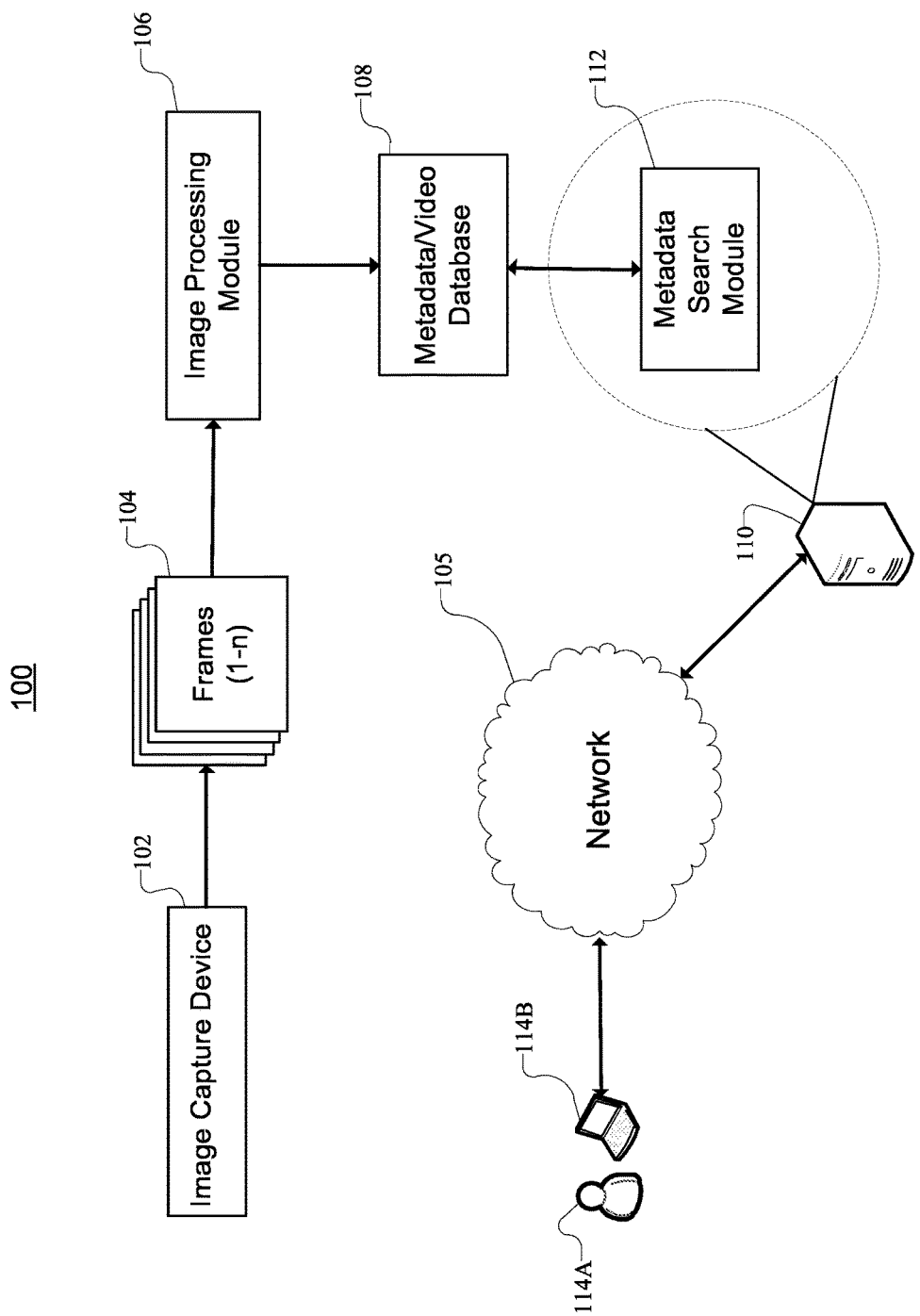
FIG. 1 illustrates an example environment in which some aspects of the technology can be implemented.

FIG. 1 illustrates an example environment 100 in which some aspects of the technology can be implemented. Environment 100 includes an image capture device 102 configured for recording video information (e.g., a video feed) as a series of image frames 104. Environment 100 further includes an image processing module 106, metadata/video database 108, and a video server 110. Additionally, environment 100 includes a user 114A, for example, that is associated with user device 114B, and communicatively coupled to video server 110, via network 105.

Environment 100 conceptually illustrates various hardware and/or software modules that can be used to implement aspects of the technology; however, it is understood that additional hardware and/or software modules can be used without departing from the scope of the technology. For example, network 105 can represent a private network such as a local area network (LAN), a wide area network (WAN), or a network of public and/or private networks, such as the Internet. Additionally, it is understood that the various software modules (e.g., image processing module 106, metadata/video database 108, and/or metadata search module 112) can be implemented on one or more hardware devices, such as an image capture device 102, or one or more computers/servers, such as server 110.

In operation, image capture device 102 is configured to record and store video data in a series of image (or video) frames, e.g. frames 104. Although image capture device 102 can include any video recording device capable of capturing or recording and storing digital video information, by way of example, image capture device 102 can be a video surveillance camera, or the like. Additionally, storage frames 104 can be performed locally (e.g., on a memory device visually coupled with image capture device 102), or made from remotely, such as via storage on one or more remote servers communicatively coupled with image capture device 102 via network 105.

Image frames 104 can be processed and stored as video capture is performed. For example, image capture device 102 can be configured to provide a real-time feed of captured image frames 104 to an image processing module configured to detect motion events. As discussed in further detail below, motion events can be detected by calculating a sum of absolute differences between frames on a frame-by-frame basis. Detected motion events can then be indexed based on various indicators, such as, a time stamp, duration, and/or an intensity associated with the frame. Subsequently, data describing the detected motion events (i.e. "motion metadata") is stored in a database, such as metadata/video database 108.

It is understood that image processing module 106 and/or metadata/video database 108 can be implemented on a common hardware platform, such image capture device 102, and/or a computer/server such as video server 110. Similarly, any of the described software modules environment 100 may be operated using one or more servers that are communicatively coupled via network 105, for example, as various software processes instantiated in a computing cluster (not illustrated).

In practice, metadata/video database 108 is accessible by a metadata search module 112 that can be used to facilitate queries relating to motion metadata for a particular set of image frames 104.

Once motion metadata has been stored, a user (e.g., user 114A) can provide a motion search query (e.g., via user device 114B) to video server 110 over a computer network, such as network 105. The search query can then be received by metadata search module 112 and used to search metadata/video database 108. As discussed in further detail below with respect to FIG. 3B, the motion search query can include boundary conditions indicating a particular area or region within the video frames in which motion events are to be searched. By permitting users to specify a particular "region of interest" for their motion search query, legacy video data can be efficiently searched only for events occurring at indicated locations of interest, increasing the speed and efficiency of the search, as well as reducing processing overhead.

By way of example, a security surveillance system can capture video footage that includes the theft of an item of interest located within a particular region within the image frame. Thus, a user may wish to only search for motion events that occur within the particular region of interest (e.g., at a location where the item was located). In such instances, the user may provide a search query in the form of a selection of the image frame area for which motion events are to be searched, for example, by indicating the area with a cursor or other input device. The search query can then be used to search motion metadata stored in a time-series database, such as that hosted by video server 110.

As discussed in further detail below, the time-series database of motion metadata can be comprised of a series of motion vectors that described various attributes of frames within the video feed. Although the motion vectors can describe essentially any attribute of an associated image frame, in some approaches, motion vectors contain information regarding the location of motion events as placed in a coarse-cell and/or macro-block (e.g., "fine cell") grid. As discussed in further detail with respect to FIG. 2A, coarse/fine-cell grids can be superimposed over an image area, effectively providing a bit mask that permits irrelevant information to be efficiently disregarded.

Figure 2A:
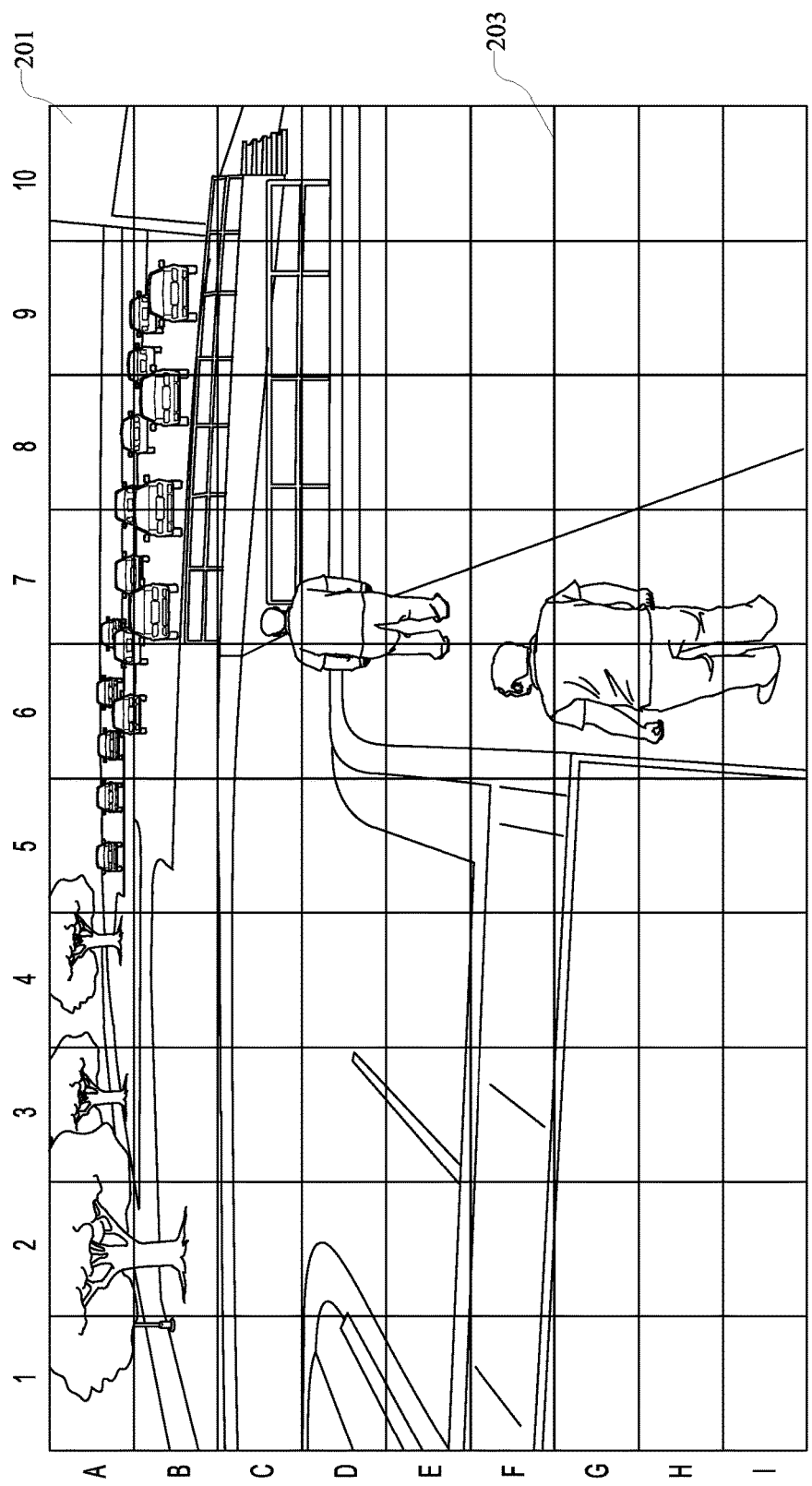
FIG. 2A illustrates an example of an image frame that is parsed into coarse-cells for facilitating motion detection, according to some aspects of the technology.

Specifically, FIG. 2A illustrates an example of an image frame 201 that is parsed into coarse-cells 203. In the example of FIG. 2A, coarse-cells 203 are arranged in a 9×10 grid superimposed over image frame 201. However, it is understood that other coarse-cell overlay dimensions can be used, without departing from the scope of the technology. As discussed in further detail below, motion detection can be performed using subdivided units of coarse-cells 203 (i.e., macro-blocks), which represent the smallest collection of adjacent pixels for which motion detection events are registered. As discussed in greater detail below, motion events associated with a particular macro-block can be identified by calculating absolute differences (e.g., in pixel color or intensity) as between common macro-blocks in adjacent frames, i.e., on a frame-to-frame basis.

Figure 2B:
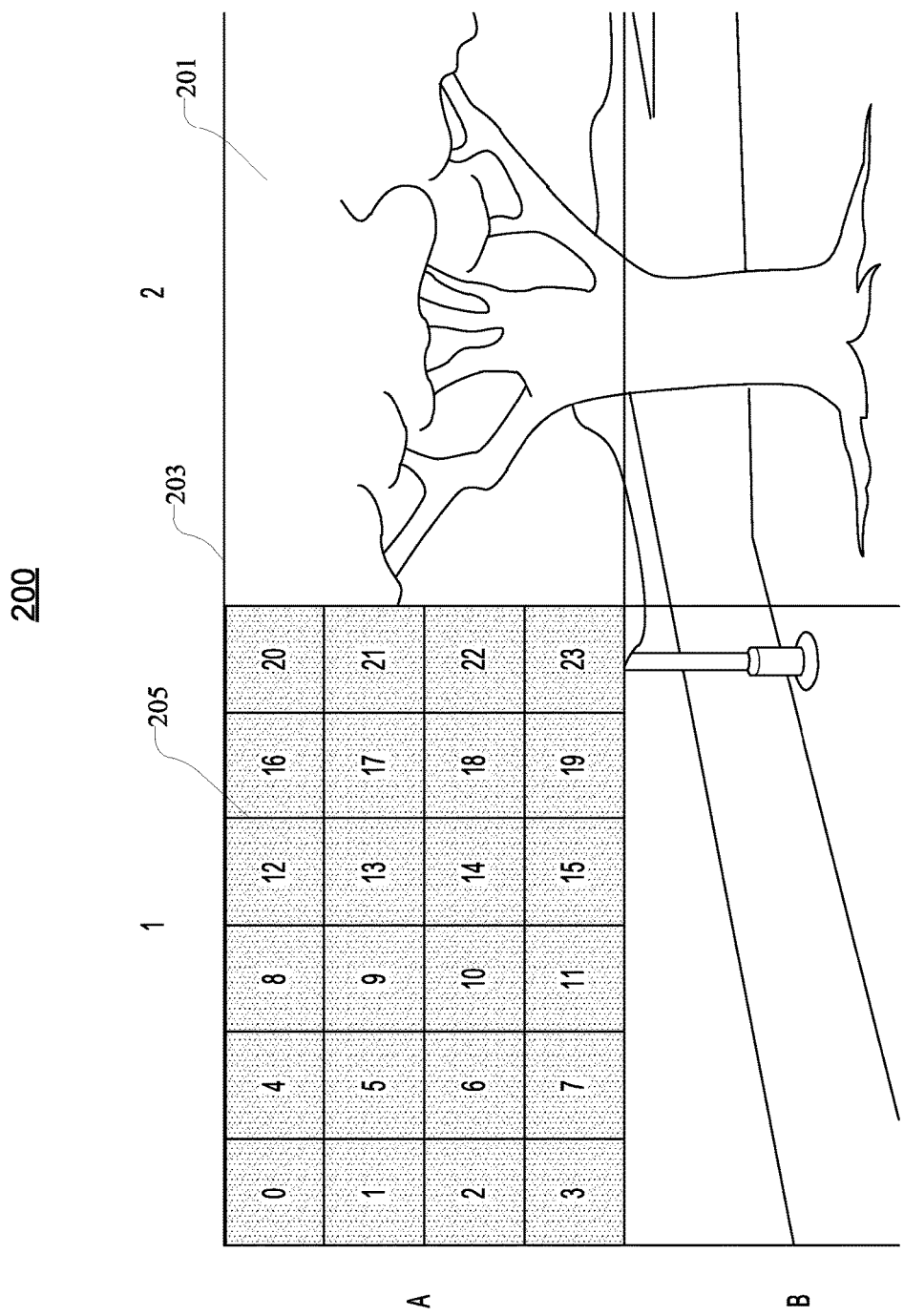
FIG. 2B illustrates an example image frame depicted in FIG. 2A, that is parsed into macro-blocks for facilitating motion detection, according to some aspects of the technology.

FIG. 2B illustrates an example of image frame 201 depicted in FIG. 2A, wherein each of coarse-cells 203 are further parsed into macro-blocks 205. Macro-blocks 205 can be used to distinguish regions within a particular coarse-cell in which motion is detected. In the example of FIG. 2B, each coarse-cell 203 contains twenty-four total macro-blocks 205; however, it is understood that any other number of macro-blocks may be used to subdivide a coarse-cell, without departing from the technology.

Calculations of motion events can be determined based on changes in pixel values for a particular macro-block across multiple image frames. In the example of FIG. 2B, macro-blocks 205 cover an area of image frame 201 (e.g., coarse-cell A1) that does not contain any motion events. In contrast, FIG. 2C illustrates an example of a coarse-cell (D7) in which a motion event is detected.

Figure 2C:
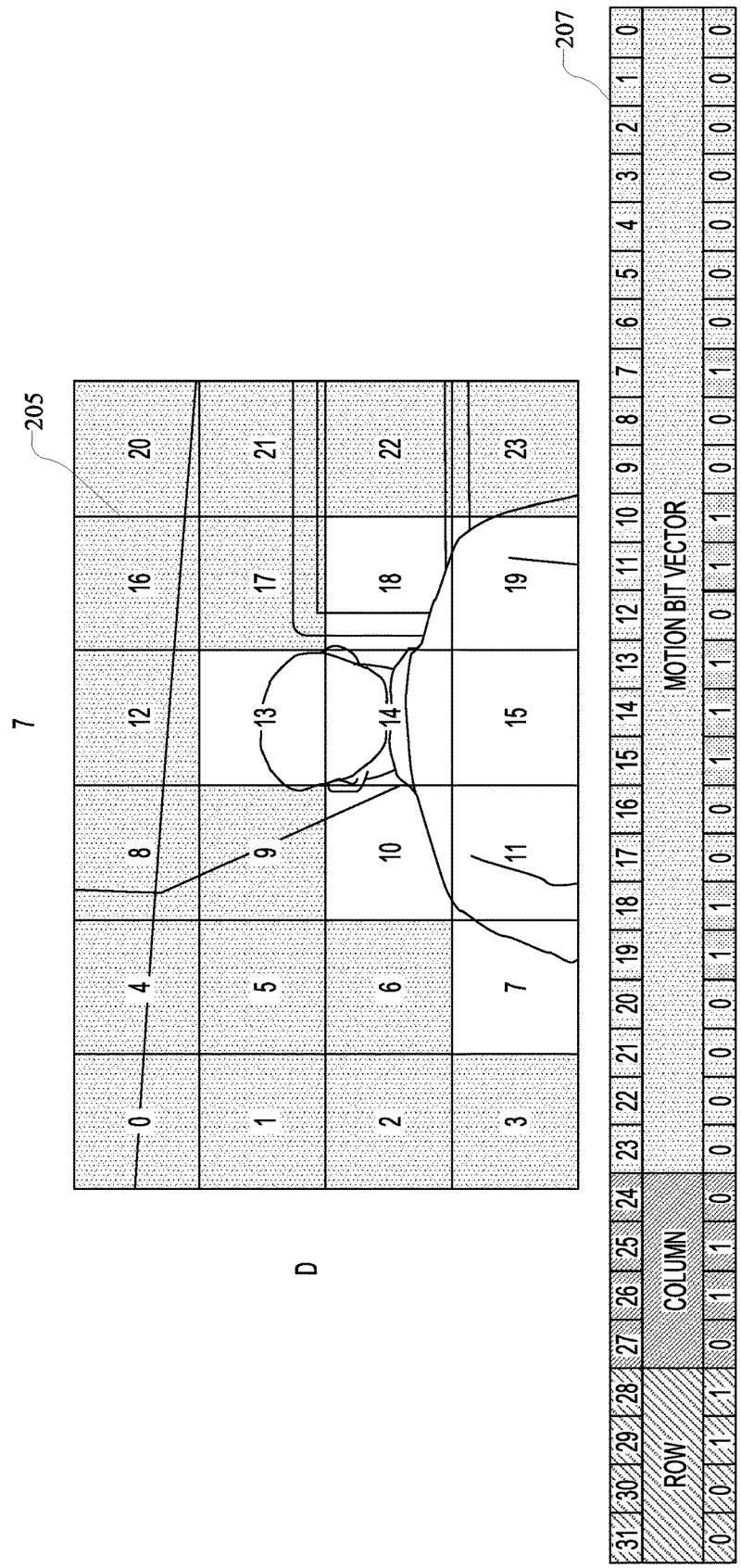
FIG. 2C illustrates an example use of macro-blocks to indicate areas of motion activity, as well as a corresponding motion vector, according to some aspects of the technology.

Specifically, FIG. 2C illustrates an example of macro-blocks 205 used to indicate locations of motion activity, for example, in coarse-cell D7, as well as a corresponding motion vector 207. In some aspects, motion vectors, such as motion vector 207, can be used to provide a compressed data format for storing motion event data.

As indicated in the example of FIG. 2C, motion events within coarse-cell D7 are identified at macro-blocks 13, 10, 14, 18, 7, 11, 15, and 19. Motion events for each macro-block are described by motion vector 207 that provides an indication of the row/column of the associated coarse-cell, as well as the associated macro-blocks in which motion has been detected. Motion vectors, such as motion vector 207, can be associated with a respective image frame that is sorted as a times-series, for example, in a database such as metadata/video database 108, discussed above.

In some aspects, the motion vector depicted by motion vector 207 is advantageous in that each macro-block can be represented as a single 32-bit integer, wherein the first four bits indicate the macro-block row, and the next four bits indicate the macro-block column. In this example, the remaining 24 bits act as a bit-mask used indicate the presence of motion within each of the macro-block cells. Therefore, in the example of FIG. 2C, the entire image can be stored as up to 90 of these 32-bit integers (e.g., 360 bytes).

In some aspects, the motion vector format also permits sparse data to be vastly compressed. For example, macro-blocks that contain no motion events are not saved, and a motion event that activates only a single macro-block cell consumes only 4 bytes of data.

Figure 3A:
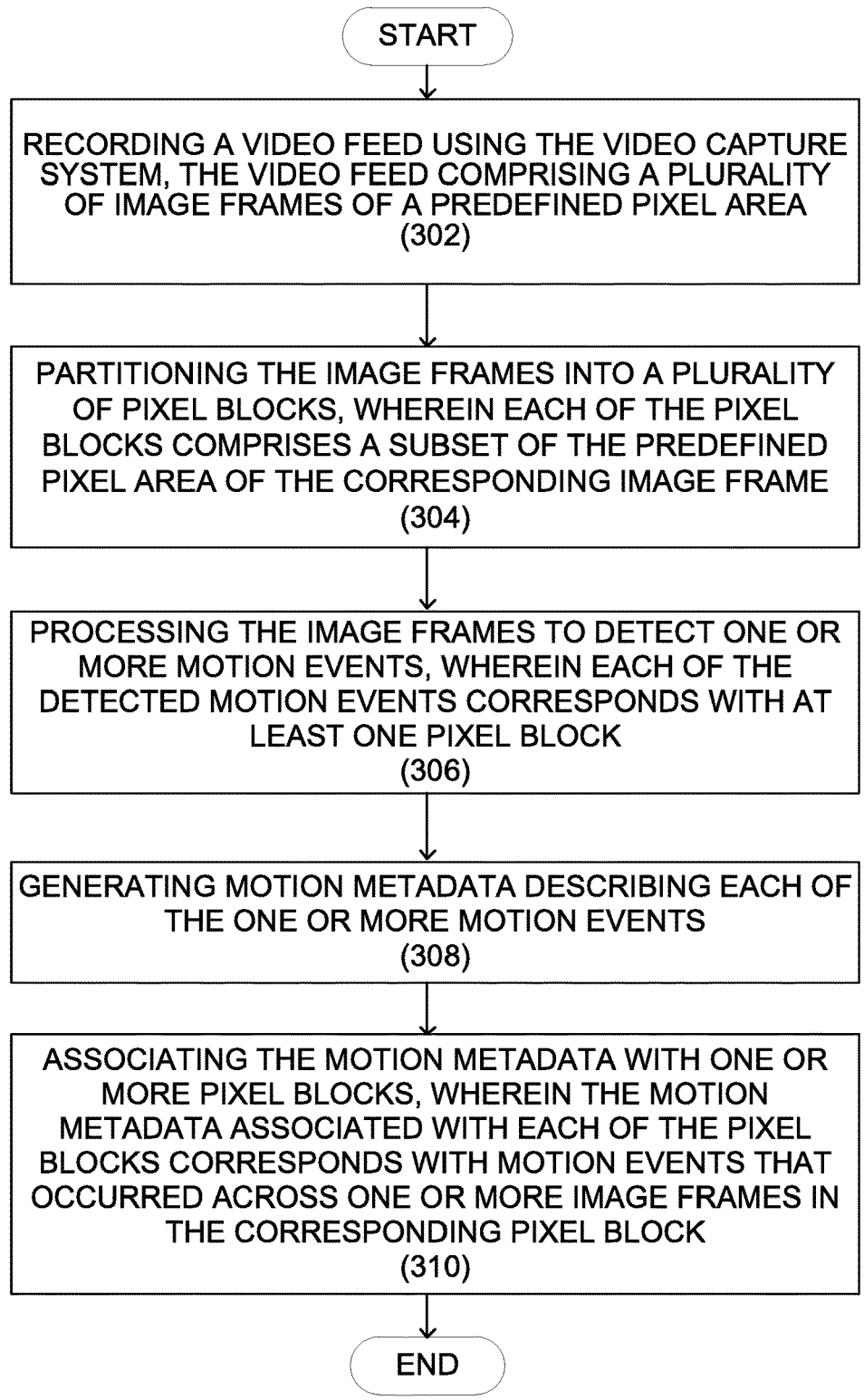
FIG. 3A illustrates steps of an example process for associating motion metadata with recorded video information.

FIG. 3A illustrates steps of an example process 300 for associating motion metadata with recorded video information. Process 300 begins with step 302, in which a video feed is captured using a video capture system, such as image capture device 102 discussed above with respect to FIG. 1. The captured video feed includes multiple image frames each of a predefined area (e.g., a predefined dimension).

In step 304, the video feed is partitioned into a plurality of pixel blocks, such as coarse-cells, and macro-blocks (fine cells), as illustrated above with respect to FIG. 2A-C. It is understood that video feed partitioning can be performed at the image capture device (e.g. a security camera), and/or at one or more computing devices, such as one or more computers/servers and/or a computing cluster.

At step 306, the image frames are processed to detect one or more motion events. Each detected motion event is associated with at least one pixel block (e.g., a macro-block). As discussed above, determinations of motion events can be based on a calculation of a sum of absolute differences (SAD) between individual macro-blocks (also "frame subtraction"). In other approaches, different types of background subtraction calculations can be implemented; however, it is understood that other motion detection methods may be used, without departing from the scope of the technology.

In step 308, motion metadata is generated based on the one or more motion events detected at step 306. As discussed above, motion metadata may be generated as a motion vector, (e.g., motion vector 207), that is used to describe various attributes associated with the motion event. Such attributes can include indications of time, coarse-block location, macro-block location, and/or intensity, etc.

Next, in step 310, the motion metadata is associated with one or more image frames and/or one or more specific pixel blocks within a respectively associated frame. As discussed in further detail below, the association of motion metadata with image frames can facilitate the convenient searching of metadata events in legacy content, for example, within a region of the image frame specified after the video feed has already been recorded.

Figure 3B:
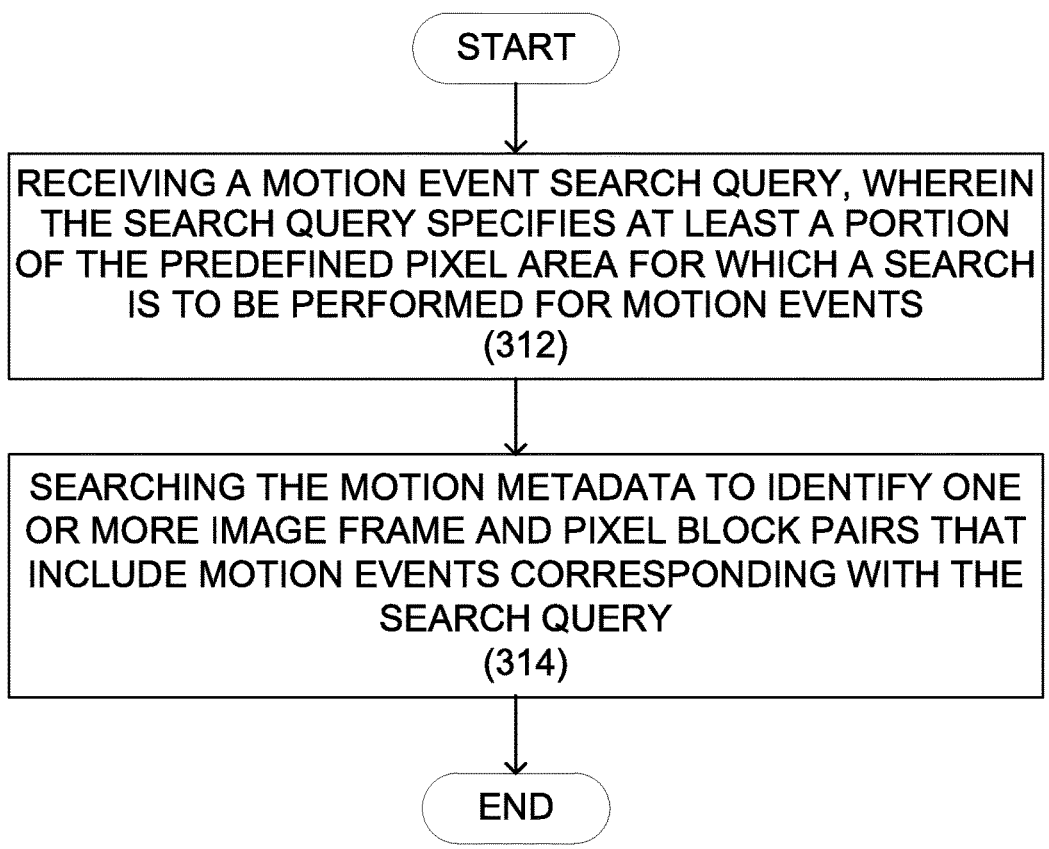
FIG. 3B illustrates of an example process for receiving a motion event search query, and performing a search through motion metadata to identify one or more motion events.

FIG. 3B illustrates of an example process 301 for performing a search through motion metadata to identify one or more motion events. Further to the example of step 310, with respect to process 300, the searching of motion metadata in process 301 begins with step 312 in which a motion event search query is received, for example, from a user or system administrator. The motion event search query can be received by a metadata search module (e.g., metadata search module 112) configured to access the metadata/video database where motion metadata is stored, such as metadata/video database 108.

Although the format of the motion event search query can depend on the desired implementation, in some aspects the motion event search query can contain information that defines at least a portion of the predefined pixel area for which the desired search is to be performed. For example, the motion event search query can take the form of a bounded area defining at least a portion of the image frame across which all of the video content is to be searched.

In some aspects, the motion event search query can contain indications of boundaries within the video feed. For example, the motion event search query may specify an area of the image frame, in conjunction with start and stop times (corresponding with different image frames or frame numbers in the feed), for which the search is to be performed. Other search parameters can include, but are not limited to, searches based on event length and/or intensity (e.g., to filter out sudden increases/decreases in ambient lighting). It is understood that other user-specified criteria may be included in the motion event search query, without departing from the scope of the technology.

Subsequently, at step 314, the motion metadata is searched to identify one or more image frames that include motion events of interest. In some aspects, the search query may return more specific information, such as, identifications of a specific pixel block (e.g., macro-block and/or micro-block), that include motion events of interest.

Further to the example provided above with respect to FIGS. 2A-2C, if a user specifies an area of the image frame that includes macro-block D7, the search could be performed across all macro-blocks corresponding with the user-specified area, across all image frames. In this example, because motion events have been identified to occur in those blocks, for example, at least in block D7 (as specified by motion vector 207), the associated frames and/or blocks would be returned to the user for further review.

EXAMPLE DEVICE

Figure 4:
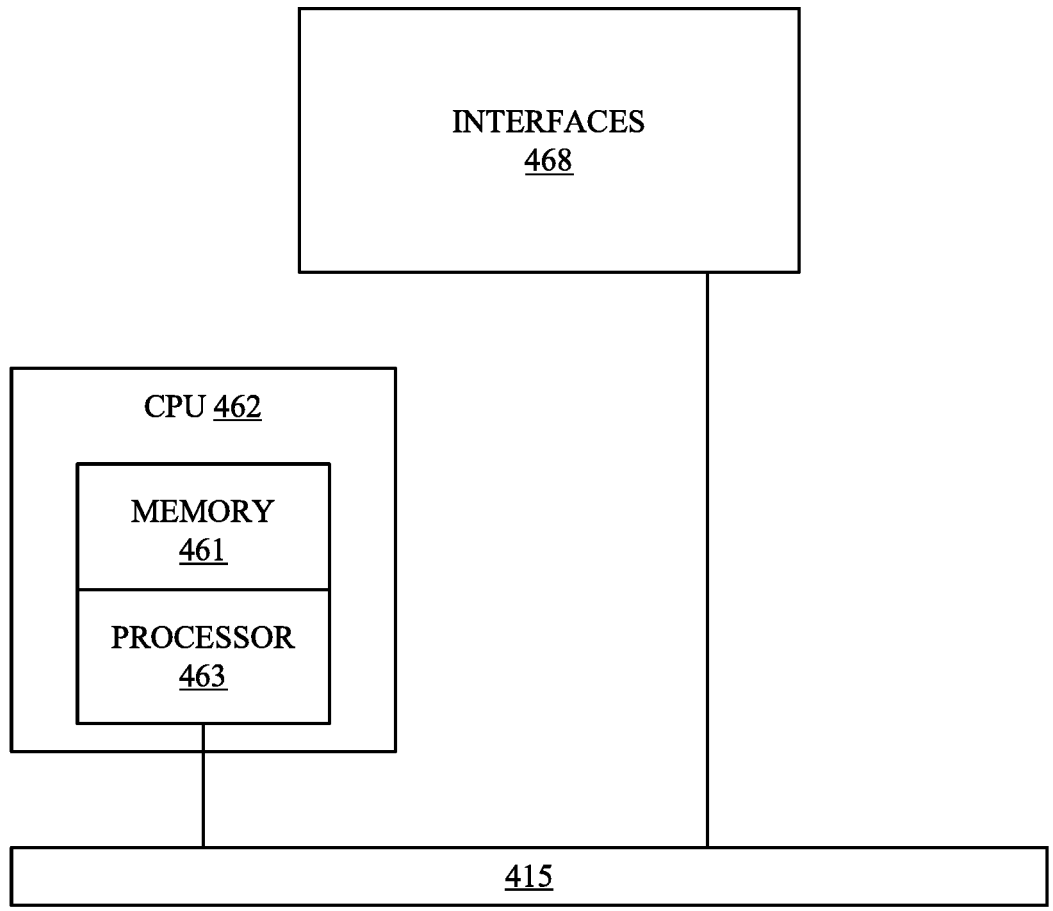
FIG. 4 illustrates an example processor-based device on which aspects of the technology can be implemented.

FIG. 4 illustrates an example processor-based device 400 that can be used to implement various aspects of the technology. For example, processor-based device 400 may be used to implement an image capture device (e.g., image capture device 102), or a video server, such as video server 110 discussed above with respect to FIG. 1. It is further understood that processor-based device 400 may be used in conjunction with one or more other processor-based devices, for example, as part of a computer network or computing cluster.

Processor-based device 400 includes a master central processing unit (CPU) 462, interfaces 468, and a bus 415 (e.g., a PCI bus). When acting under the control of appropriate software and/or firmware, the CPU 462 can be configured for executing operations necessary to process video content to determine motion events within one or more image frames, as described above.

CPU 462 preferably accomplishes all these functions under the control of software including an operating system and any appropriate applications software. CPU 462 can include one or more processors 463 such as a processor from the Motorola family of microprocessors or the MIPS family of microprocessors. In an alternative embodiment, processor 463 is specially designed hardware for controlling the operations of processor-based device 400. In a specific embodiment, a memory 461 (such as non-volatile RAM and/or ROM) also forms part of CPU 462. However, there are many different ways in which memory could be coupled to the system.

Interfaces 468 can be provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A video capture system, comprising:
one or more processors; and
a non-transitory memory coupled to the processors, the memory storing instructions configured to cause the processors to perform operations comprising:
  recording a video feed using the video capture system, the video feed comprising a plurality of image frames of a predefined pixel area;
  partitioning the image frames into a plurality of pixel blocks, wherein each of the pixel blocks comprises a subset of the predefined pixel area of the corresponding image frame;
  processing each of the plurality blocks of the image frames to detect one or more motion events that occurred across one or more image fames in the corresponding pixel block; and
  generating motion metadata describing each of the one or more motion events;
  wherein the processing detects motion events within the image frames without being previously directed to specific areas of the image frame.

2. The video capture system of claim 1, further comprising:
associating the motion metadata with one or more pixel blocks, wherein the motion metadata associated with each of the pixel blocks corresponds with motion events that occurred across one or more image fames in the corresponding pixel block.

3. The video capture system of claim 1, further comprising:
receiving a motion event search query, wherein the search query specifies at least a portion of the predefined pixel area for which a search is to be performed for motion events in the recorded video feed; and
searching the motion metadata to identify one or more image frame and pixel block pairs that include motion events corresponding with the search query.

4. The video capture system of claim 3, wherein the search query specifies a start time and an end time for which motion metadata of the recorded video feed is to be searched.

5. The video capture system of claim 1, wherein processing the image frames to detect one or more motion events further comprises:
quantifying motion events for one or more of the pixel blocks; and
determining if the quantity of motion in each of the one or more pixel blocks exceeds a predetermined threshold.

6. The video capture system of claim 5, wherein the motion events are quantified based on an absolute difference of pixels between two or more image frames of the video feed.

7. The video capture system of claim 1, wherein the motion metadata comprises one or more of: duration information, time stamp information, or spatial data.

8. A method of generating motion metadata, the method comprising:
recording a video feed using the video capture system, the video feed comprising a plurality of image frames of a predefined pixel area;
partitioning the image frames into a plurality of pixel blocks, wherein each of the pixel blocks comprises a subset of the predefined pixel area of the corresponding image frame;

processing each of the plurality blocks of the image frames to detect one or more motion events that occurred across one or more image fames in the corresponding pixel block; and generating motion metadata describing each of the one or more motion events;

wherein the processing detects motion events within the image frames without being previously directed to specific areas of the image frame.

9. The method of claim 8, further comprising:

associating the motion metadata with one or more pixel blocks, wherein the motion metadata associated with each of the pixel blocks corresponds with motion events that occurred across one or more image fames in the corresponding pixel block.

10. The method of claim 8, further comprising:

receiving a motion event search query, wherein the search query specifies at least a portion of the predefined pixel area for which a search is to be performed for motion events in the recorded video feed; and searching the motion metadata to identify one or more image frame and pixel block pairs that include motion events corresponding with the search query.

11. The method of claim 10, wherein the search query specifies a start time and an end time for which motion metadata of the recorded video feed is to be searched.

12. The method of claim 8, wherein processing the image frames to detect one or more motion events further comprises:

quantifying motion events for one or more of the pixel blocks; and determining if the quantity of motion in each of the one or more pixel blocks exceeds a predetermined threshold.

13. The method of claim 12, wherein the motion events are quantified based on an absolute difference of pixels between two or more image frames of the video feed.

14. The method of claim 8, wherein the motion metadata comprises one or more of: duration information, time stamp information, or spatial data.

15. A non-transitory computer-readable storage medium comprising instructions stored therein, which when executed by one or more processors, cause the processors to perform operations comprising:

recording a video feed using the video capture system, the video feed comprising a plurality of image frames of a predefined pixel area;

partitioning the image frames into a plurality of pixel blocks, wherein each of the pixel blocks comprises a subset of the predefined pixel area of the corresponding image frame;

processing each of the plurality blocks of the image frames to detect one or more motion events that occurred across one or more image fames in the corresponding pixel block; and generating motion metadata describing each of the one or more motion events;

wherein the processing detects motion events within the image frames without being previously directed to specific areas of the image frame.

16. The non-transitory computer-readable storage medium of claim 15, wherein the instructions are further configured to cause the processors to perform operations comprising:

associating the motion metadata with one or more pixel blocks, wherein the motion metadata associated with each of the pixel blocks corresponds with motion events that occurred across one or more image fames in the corresponding pixel block.

17. The non-transitory computer-readable storage medium of claim 15, wherein the instructions are further configured to cause the processors to perform operations comprising:

receiving a motion event search query, wherein the search query specifies at least a portion of the predefined pixel area for which a search is to be performed for motion events in the recorded video feed; and searching the motion metadata to identify one or more image frame and pixel block pairs that include motion events corresponding with the search query.

18. The non-transitory computer-readable storage medium of claim 17, wherein the search query specifies a start time and an end time for which motion metadata of the recorded video feed is to be searched.

19. The non-transitory computer-readable storage medium of claim 15, wherein the instructions are further configured to cause the processors to perform operations comprising:

quantifying motion events for one or more of the pixel blocks; and determining if the quantity of motion in each of the one or more pixel blocks exceeds a predetermined threshold.

20. The non-transitory computer-readable storage medium of claim 15, wherein the motion events are quantified based on an absolute difference of pixels between two or more image frames of the video feed.

* * * * *